April 12, 1932.  G. A. JOHNSON ET AL  1,853,730
FRICTION SHOCK ABSORBING MECHANISM
Filed June 19, 1929
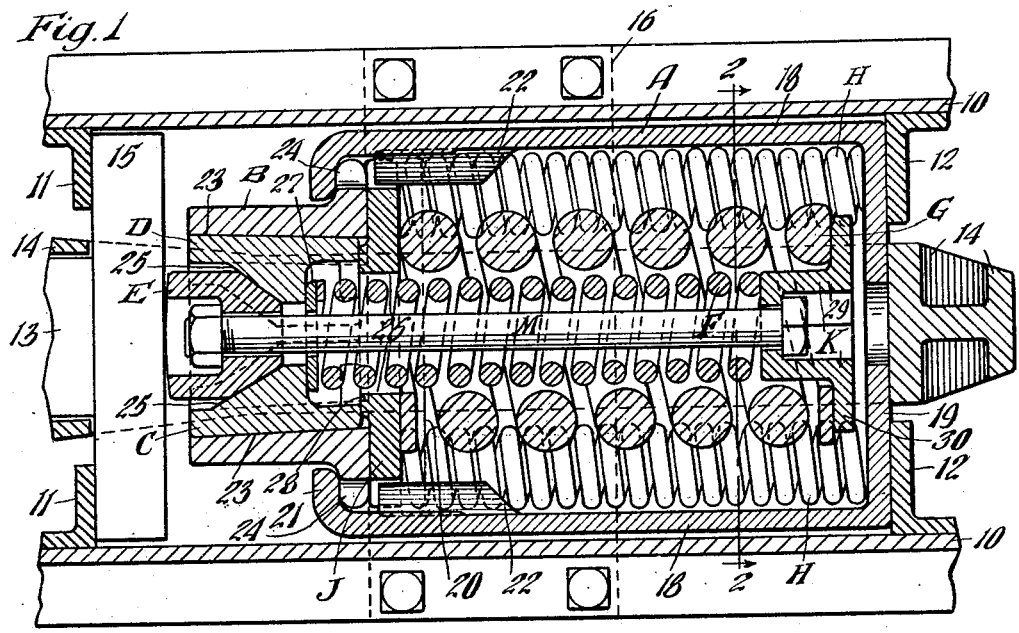
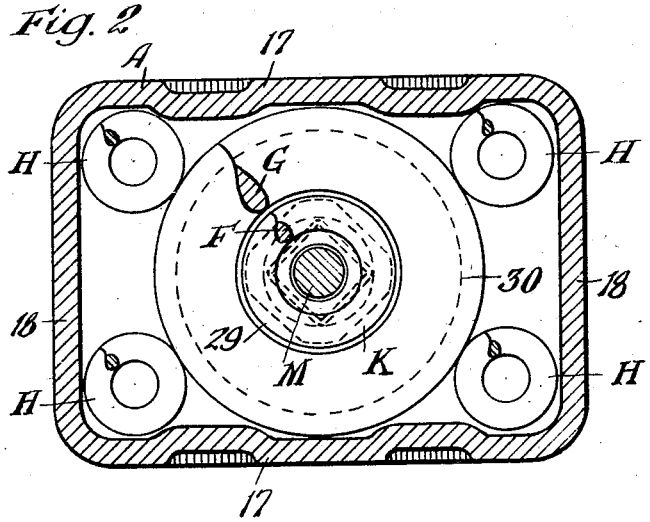
Inventors
George A. Johnson
Stacy B. Haseltine
Witness
Wm. Geiger
By Joseph Harris
Their Atty.

Patented Apr. 12, 1932

1,853,730

UNITED STATES PATENT OFFICE

GEORGE A. JOHNSON AND STACY B. HASELTINE, OF CHICAGO, ILLINOIS, ASSIGNORS TO W. H. MINER, INC., A CORPORATION OF DELAWARE

FRICTION SHOCK ABSORBING MECHANISM

Application filed June 19, 1929. Serial No. 372,113.

This invention relates to improvements in friction shock absorbing mechanisms.

One object of the invention is to provide a friction shock absorbing mechanism especially adapted for railway draft riggings having relatively light initial action followed by increased resistance, to absorb the heavier shocks, produced by successively acting spring means and friction elements cooperating therewith.

A further object of the invention is to provide a friction shock absorbing mechanism having graduated action produced by spring resistance means and cooperating relatively movable friction elements, wherein a part of said spring resistance means is movable bodily as a unit during the first part of the compression stroke, while the remainder of said spring resistance is being compressed to provide light initial action, and bodily movement of said part of the spring resistance is arrested by engagement of one end thereof with abutment means after a predetermined compression of the mechanism, to compel compression thereof, thus increasing the resistance.

Another object of the invention is to provide a friction shock absorbing mechanism, including a spring cage; a friction shell movable with respect to the cage during a predetermined part only of the compression stroke of the mechanism and held against relative movement during the remainder of the action of the gear; friction means cooperating with the shell and relatively movable thereto; spring resistance means within the cage opposing relative movement of the shell and cage; and additional spring resistance means becoming effective after a predetermined compression of the first named spring resistance to increase the resistance to relative movement of the shell cage, said first named spring resistance and additional spring resistance also opposing relative movement of the friction means and shell after movement of the shell with respect to the cage has been arrested to thereby provide ultimate high capacity to absorb the heavier shocks.

A more specific object of the invention is to provide a friction shock absorbing mechanism including a spring cage; a friction shell movable with respect to the cage to an extent less than the full compression stroke of the mechanism and having its movement outwardly of the cage limited; friction shoes cooperating with the shell; a wedge engaging the shoes; a spring follower cooperating with the shell and shoes; a spring resistance means within the cage including a plurality of elements, certain of which are interposed directly between the spring follower and the rear end of the cage and are operative during the entire compression stroke of the mechanism, and others of which yieldingly retain said wedge assembled with the cage and are operative to resist inward movement of the shell and friction elements after a predetermined compression of the first named spring elements.

A further object of the invention is to provide a friction shock absorbing mechanism of the character indicated in the preceding paragraph, wherein the spring means which yieldingly retains the wedge assembled with the remainder of the mechanism cooperates with a spring follower cap connected to the wedge member by a retaining element and reacts between the spring follower and the spring follower cap, and wherein the spring follower cap is normally spaced a predetermined distance from the rear end wall of the cage to permit a certain amount of compression of the mechanism before engagement of the cap with the cage to produce compression of the spring means cooperating with the cap.

Other objects of the invention will more clearly appear from the description and claims hereinafter following.

In the drawings, forming a part of this specification, Figure 1 is a horizontal, longitudinal, sectional view through the underframe structure of a railway car, illustrating our improvements in connection therewith. And Figure 2 is a vertical, transverse, sectional view corresponding substantially to line 2—2 of Figure 1.

In said drawings, 10—10 designate channel-shaped center or draft sills of a railway car underframe to the inner faces of which are secured the usual front stop lugs 11—11 and rear stop lugs 12—12. The inner end portion of the coupler shank is indicated by 13 and has operatively connected thereto a hooded yoke 14 of well known form. My improved shock absorbing mechanism and a front main follower 15 are disposed within the yoke, and the yoke in turn is supported by a saddle plate 16 detachably secured to the bottom flanges of the draft sills 10.

Our improved shock absorbing mechanism comprises broadly a spring cage A; a friction shell B; a pair of friction shoes C and D; a main wedge block E; spring resistance means including central spring members F and G and four outer spring members H—H; a spring follower J; a spring follower cap K; and a retainer bolt M.

The spring cage A is in the form of a substantially rectangular box-like member having spaced top and bottom walls 17—17, spaced vertical side walls 18—18 and a vertical, transverse rear end wall 19 cooperating with the stop lugs 12 in the manner of the usual rear follower. The top and bottom walls at the front end of the spring cage are provided with transverse shoulders 20—20 which form inner stop means to limit the movement of the friction shell B, as hereinafter more fully pointed out. The side walls 18 of the casing or cage A are inturned at the forward ends as indicated at 21—21 to provide vertically disposed retaining flanges. Inwardly of the retaining flanges, the top and bottom walls 17 of the casing are cut away so as to facilitate assembling of the friction shell with the cage. As shown in Figure 1, the side walls of the cage are provided with relatively short interior ribs 22—22 adjacent the front end of the cage which form guide means cooperating with the spring follower J and shell B.

The friction shell B is also preferably of rectangular cross section and has opposed side walls provided with interior friction surfaces 23—23 extending lengthwise of the shell and converging inwardly thereof. The shell B is operatively connected to the cage A by means of laterally projecting flanges 24—24 at the inner end of the shell engaging in back of the flanges 21 of the cage. As will be evident, the shell B is thus anchored to the cage and outward movement of the shell with respect to the cage is positively limited. Inward movement of the shell with respect to the cage is limited by engagement of the inner ends of the top and bottom walls of the shell with the abutment shoulders 20 of the cage. The parts are so proportioned that the relative longitudinal movement of the friction shell and spring cage is less than the full compression stroke of the mechanism.

The friction shoes C and D have frictional engagement with the friction surfaces 23 of the shell B. Each shoe has a lateral enlargement on the inner side thereof provided with the wedge face 25 cooperating with a similar wedge face at the corresponding side of the wedge block E. The wedge block E bears directly on the inner side of the main follower 15 and the end face of the block E which engages the follower is preferably convex as shown. As disclosed in Figure 1, the wedge faces at the opposite sides of the wedge block and the cooperating wedge faces of the friction shoes C and D are of different angularity, one of said sets of cooperating faces being disposed at a relatively keen wedging angle with respect to the longitudinal axis of the mechanism, while the other cooperating set of wedge faces are disposed at a blunt releasing angle. The cooperating engaging wedge faces of the wedge block and shoes and the cooperating engaging friction surfaces of the shoes and shell are preferably of V-shape section so as to prevent relative vertical displacement of the parts.

The spring resistance means, which is disposed within the spring cage A and opposes relative movement of the parts comprises the central spring members F and G and four outer spring members H, H, H, and H disposed at the four corners of the cage. The spring resistance G is heavier than the spring F and as shown in the drawings surrounds the latter. The spring follower J is interposed between the front ends of the springs G and H and the inner end of the friction shell B. As shown, the central spring F extends through a central opening 26 in the spring follower and cooperates directly with the friction shoes, a spring follower disc 27 being interposed between the front end of the spring F and the enlargements of the friction shoes. The spring follower J is thickened adjacent the opening 26 thereof as indicated at 28, thereby providing abutment means bearing directly on the inner ends of the friction shoes. Both of the spring follower J and the flanges 24 of the friction shell B are slotted at their outer edges to cooperate with the guide ribs 22 of the cage A. The spring members H bear directly on the transverse rear end wall 19 of the spring cage while the springs F and G are normally spaced from said end wall. The spring G serves to yieldingly maintain the wedge block E assembled with the cage and friction shell, thereby preventing injury to the retainer bolt in release of the mechanism. The spring G bears directly on the spring cap K which is connected to the rear end of the retainer bolt M, the front end of the bolt being anchored to the wedge block E. As shown, the head of the bolt is accommodated in a suitable recess in the wedge block E. The spring cap K has a cup-like portion 29 in which the head of the bolt is movable. At the rear end the cap K is provided with an annular flange 30 outwardly projecting therefrom which directly engages the rear end of the spring member G. The rear end of the inner spring F bears on the forwardly projecting cup portion of the cap K. As clearly shown in Figure 1, the flange 30 of the cap is normally spaced from the transverse end wall 19 of the spring cage a distance less than the spacing between the inner end of the friction shell B and the stop shoulders 20 of the cage, thereby providing successive compression of the spring resistance members F and G and the spring resistance members H before movement of the friction shell is arrested and the friction elements are actuated with respect to the shell.

The operation of our improved shock absorbing mechanism is as follows: During a buffing action, the main follower 15 will be forced rearwardly with respect to the spring cage A which is held stationary by the stop lugs 12. During a draft action, the movement of the parts is reversed, the yoke pulling the spring cage A outwardly toward the main follower 15 which is held stationary by the front stop lugs 11. It is thus evident that during either a draft or buffing action the main follower 15 and the spring cage A will be moved inwardly relative to each other. During the first part of the relative approach of the follower 15 and the cage A, the friction shell B will be forced inwardly of the cage against the resistance of the spring means, the friction between the wedge block, the friction shoes and the friction shell being such that these parts will be actuated substantially in unison. Inasmuch as the spring follower cap K is initially spaced from the end wall 19 of the spring cage, the four spring members H will first be compressed. After the clearance between the cap K and the wall 19 of the cage has been taken up, the springs F and G will also be compressed against the end wall 19. During this stage of the operation, inward movement of the friction shell is thus resisted by all of the spring elements composing the spring resistance. Inasmuch as the spacing between the inner end of the friction shell and the shoulders 20 of the spring cage is greater than the spacing between the spring follower cap K and the wall 19 of the cage, the entire spring resistance will be further compressed by the movement of the friction shell after movement of the spring cap K has been arrested. During the continued compression of the mechanism, the friction shell B will engage the shoulders 20 of the cage and movement of the shell with respect to the cage will be positively stopped, thus compelling relative movement of the friction means comprising the wedge block and friction shoes, with respect to the friction shell during the remainder of the compression stroke of the mechanism. As is obvious, the wedge block spreads the friction shoes apart forcing the same against the friction surfaces of the shell and rearwardly of the mechanism along said friction surfaces. The spring follower J which is engaged by the shoes is forced rearwardly against the springs G and H, thereby compressing the same, and the spring F is compressed between the spring follower disc 27 and the spring follower cap K. Compression of the mechanism is finally limited by engagement of the main follower 15 with the front end of the friction shell B, whereupon the actuating force is transmitted directly through the shell B, the spring cage a and the stop lugs to the draft sills, preventing undue compression of the main spring resistance elements.

In release of the mechanism, when the actuating force is reduced, the spring resistance elements H will force the shell and friction shoes outwardly, movement of the shell being limited by the flanges 24 thereof engaging the flanges 21 of the cage and movement of the friction shoes being limited by the wedge block E, movement of which is arrested by the retainer bolt M which is yieldingly held against outward movement by the spring resistance member G.

Our improved construction provides a friction shock absorbing mechanism having graduated spring action during the first part of the compression stroke, thereby especially adapting the same for use in connection with passenger equipment. A decided advantage is obtained by providing spring means which performs a dual function of opposing relative movement of the friction shell and spring cage and yieldingly retaining the parts assembled in that the number of parts of the mechanism are thus reduced without sacrificing capacity of the gear.

We have herein shown and described what we now consider the preferred manner of carrying out our invention, but the same is merely illustrative and we contemplate all changes and modifications that come within the scope of the claims appended hereto.

We claim:

1. In a friction shock absorbing mechanism, the combination with a spring cage closed at one end; of a friction shell movably connected to the open end of the cage, said shell and cage having relative movement to an extent less than the full compression stroke of the mechanism; friction shoes cooperating with the shell; a block having wedging engagement with the shoes; spring resistance means within the cage; a spring follower interposed between the spring resistance means and the inner end of the shell and cooperating with the shoes; a retainer bolt connected at its outer end to the block; a spring follower cap connected to the inner end of the bolt and held spaced from the closed end of the cage, said spring resistance means including a plurality of elements, certain of which are interposed between the closed end of the cage and the spring follower and another of which is interposed between the spring follower and the spring cap.

2. In a friction shock absorbing mechanism, the combination with a spring cage closed at one end and having a friction shell at the other end; of friction means cooperating with the shell; retainer means for limiting outward movement of the friction means; spring resistance means opposing relative movement of the friction means and shell including a plurality of spring members, certain of which bear directly on the closed end of the shell and another of which cooperates with said retainer means and is normally held spaced from the closed end of the cage by said retainer means.

3. In a friction shock absorbing mechanism, the combination with a spring cage closed at one end and provided with a friction shell member at the other end; of friction shoes cooperating with the shell; a block having wedging engagement with the shoes; a retainer bolt connected at the outer end of said block; a spring follower cap connected to the inner end of the bolt and normally held spaced from the closed end of the cage; a spring follower element cooperating with the shoes; spring resistance means interposed between the spring follower element and the closed end of the cage; and additional spring resistance means interposed between the spring follower element and the spring follower cap.

4. In a friction shock absorbing mechanism, the combination with a spring cage closed at one end and open at the other end; of a friction shell connected to the open end of the cage, said shell and cage being movable relatively to each other to an extent less than the full compression stroke of the mechanism; friction shoes cooperating with the shell; a wedge block cooperating with the shoes; a retainer bolt anchored to the wedge block; a spring cap connected to the inner end of the bolt and held thereby normally spaced from the closed end of the cage; a spring follower engaging the inner end of the shell and also cooperating with the friction shoes; spring resistance means interposed between the spring follower and the closed end of the cage; spring means interposed between the spring follower and spring cap; and a spring member interposed between the shoes and the spring cap, said last named spring member extending freely through the spring follower.

In witness that we claim the foregoing, we have hereunto subscribed our names this 17th day of June, 1929.

GEORGE A. JOHNSON.
STACY B. HASELTINE.